United States Patent
Kim et al.

(10) Patent No.: US 7,775,179 B2
(45) Date of Patent: Aug. 17, 2010

(54) APPARATUS AND METHOD FOR FABRICATING A COLOR FILTER

(75) Inventors: Min-soo Kim, Seoul (KR); Seung-joo Shin, Seoul (KR); Seong-jin Kim, Seongnam-si (KR); Seog-soon Baek, Suwon-si (KR); Yong-soo Lee, Seoul (KR); Keon Kuk, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1243 days.

(21) Appl. No.: 11/335,741

(22) Filed: Jan. 20, 2006

(65) Prior Publication Data

US 2006/0165878 A1    Jul. 27, 2006

(30) Foreign Application Priority Data

Jan. 21, 2005    (KR) .................. 10-2005-0005837

(51) Int. Cl.
*B05C 11/00* (2006.01)
*B05B 3/00* (2006.01)
*B41J 29/393* (2006.01)

(52) U.S. Cl. .................. 118/712; 118/665; 118/323; 347/19

(58) Field of Classification Search .......... 118/712, 118/713, 665, 704, 679–685, 300, 313–315, 118/321, 323; 347/19, 9–11, 17, 54, 68–70, 347/81; 356/614, 624
See application file for complete search history.

(56) References Cited

U.S. PATENT DOCUMENTS

| | | | |
|---|---|---|---|
| 6,257,143 B1 * | 7/2001 | Iwasaki et al. | 101/481 |
| 6,305,777 B1 * | 10/2001 | Lee | 347/19 |
| 2002/0142493 A1 * | 10/2002 | Halliyal et al. | 438/14 |
| 2004/0051817 A1 * | 3/2004 | Takahashi et al. | 349/1 |
| 2004/0119779 A1 * | 6/2004 | Elgee | 347/40 |
| 2004/0223022 A1 * | 11/2004 | Endo | 347/19 |

FOREIGN PATENT DOCUMENTS

| | | |
|---|---|---|
| JP | 2000-292614 | 10/2000 |
| JP | 2004-310726 | 11/2004 |

* cited by examiner

*Primary Examiner*—Yewebdar T Tadesse
(74) *Attorney, Agent, or Firm*—Lee & Morse, P.C.

(57) ABSTRACT

An apparatus and method for fabricating a color filter by printing pixels on a substrate using an ink jet head, optically analyzing pixel quality and controlling printing in accordance with the pixel quality. Optically analyzing may include analyzing a number of ink droplets or a transmittance of a printed pixel.

19 Claims, 4 Drawing Sheets

APPARATUS AND METHOD FOR FABRICATING A COLOR FILTER

BACKGROUND OF THE INVENTION

1. Field of the Invention

The present invention relates to an apparatus and method for fabricating a color filter. More particularly, the present invention relates to an apparatus and method for fabricating a color filter using an ink jet process.

2. Description of the Related Art

Cathode ray tube monitors (CRTs) have traditionally been used as display devices for televisions (TVs) and computers. Recently, as demands for large-screen display devices have increased, flat panel display devices have become increasingly desirable. Examples of flat panel display devices include liquid crystal displays (LCDs), plasma display panels (PDPs), electroluminescent (EL) displays, light emitting diode (LED) displays, field emission displays (FEDs), etc. Of these, LCDs are widely used for computer work station monitors and notebook computer displays because of their low power consumption.

The typical LCD creates an image of a desired color by transmitting white light modulated by a liquid crystal layer and includes a color filter to generate color from the white light. The color filter may include a plurality of red (R), green (G) and blue (B) pixels that are arranged in a predetermined pattern on a substrate, e.g., a transparent substrate.

Methods of fabricating the color filter include, e.g., a dyeing method, a pigment dispersion method, a printing method, and an electrode position method. These methods, however, may be inefficient and expensive because a given process must be repeated to form each of the R, G and B pixels. Color filter fabrication methods using an ink jet process may simplify the fabrication process and reduce the fabrication cost.

In order to fabricate a color filter using the inkjet process, ink droplets of a given color (e.g., R, G or B color) may be discharged through nozzles of an inkjet head onto each pixel on a substrate to form a pixel of the given color. Each pixel may be formed by repeating, for a predetermined number of times, one or more printing steps of discharging a predetermined number of ink droplets through an inkjet head. However, abnormal or abortive ejection of ink droplets during the printing steps may occur, which may result in unsatisfactory pixels.

SUMMARY OF THE INVENTION

The present invention is therefore directed to an apparatus and method for fabricating a color filter, which substantially overcome one or more of the problems due to the limitations and disadvantages of the related art.

It is therefore a feature of an embodiment of the present invention to provide an apparatus and method for fabricating a color filter that uses an inkjet head, and uses a light source, a photodetector and an analyzer for determining the quality of printed pixels of the color filter.

It is therefore another feature of an embodiment of the present invention to provide an apparatus and method for fabricating a color filter that count ink droplets ejected by a print head.

It is therefore yet another feature of an embodiment of the present invention to provide an apparatus and method for fabricating a color filter that measure a transmittance of a pixel printed by a print head.

It is still another feature of an embodiment of the present invention to provide an apparatus and method for controlling an inkjet head in accordance with pixel quality.

At least one of the above and other features and advantages of the present invention may be realized by providing an apparatus for fabricating a color filter including an inkjet head disposed to print a pixel on a substrate, an optical system disposed relative to the inkjet head and the substrate, the optical system including a light source for emitting light and a photodetector for detecting the light, the photodetector generating data indicative of a pixel quality of the pixel, and an analyzer receiving the data, determining the pixel quality based on the data and controlling the inkjet head in accordance with the pixel quality.

The light source may be a point light source emitting a line beam. The light source may be a line light source emitting a sheet beam. The light source may be a laser diode. The photodetector may be a photodiode. The inkjet head may be a thermal inkjet head or a piezoelectric inkjet head. The apparatus may further include one or more additional inkjet heads, light sources, photodetectors, or combinations thereof.

The inkjet head may be disposed between the light source and the photodetector such that ink droplets ejected from the inkjet head pass through light emitted by the light source, and the analyzer may determine the quality of the printed pixel based on a number of ink droplets that pass through the emitted light.

The apparatus may further include a first carriage reciprocating in a first direction and having the inkjet head mounted there to, a second carriage reciprocating in a second direction and having the light source mounted there to, and a third carriage reciprocating in the second direction and having the photodetector mounted there to. The second direction may be substantially perpendicular to the first direction. The second and third carriages may move corresponding to each other.

The light source may be disposed to emit light at the printed pixel, the photodetector may be disposed to detect light transmitted by the printed pixel, and the analyzer may determine the quality of the printed pixel based on a transmittance of the printed pixel. The light source and the photodetector may be disposed such that light emitted by the light source and detected by the photodetector passes through the printed pixel in a direction that is substantially perpendicular to the printed pixel. The light source and the photodetector may be arranged relative to the inkjet head such that that light emitted by the light source and detected by the photodetector passes through a recently printed pixel. The photodetector may be disposed adjacent to the inkjet head, and the light source may be disposed opposite to the photodetector such that a substrate being printed is interposed between the photodetector and the light source.

The apparatus may further include a first carriage reciprocating in a first direction and having the inkjet head and the photodetector mounted there to, and a second carriage reciprocating in the first direction and having the light source mounted thereto. The first and second carriages may move corresponding to each other. The light source may be disposed adjacent to the inkjet head, and the photodetector may be disposed opposite to the light source such that a substrate being printed is interposed between the photodetector and the light source.

The apparatus may further include a first carriage reciprocating in a first direction and having the inkjet head and the light source mounted there to, and a second carriage reciprocating in the first direction and having the photodetector mounted there to. The first and second carriages may move corresponding to each other.

At least one of the above features and advantages of the present invention may further be realized by providing a method of fabricating a color filter, including printing pixels on a substrate using an inkjet head, optically analyzing pixel quality, and controlling printing in accordance with the pixel quality.

When optically analyzing determines the pixel quality is unsatisfactory, controlling printing may include repairing any unsatisfactory printed pixelsdetector, wherein the quality of the printed pixel is determined based on the detected light. The quality of at least one printed pixel may be determined to be unsatisfactory. Repairing an unsatisfactory printed pixel may include making an adjustment to at least one of a size of an ink droplet to be ejected by the inkjet head, and a number of ink droplets to be ejected by the inkjet head, and ejecting one or more ink droplets from the inkjet head onto the unsatisfactory printed pixel based on the adjustment.

Optically analyzing may include providing light onto ink droplets ejected by the inkjet head, detecting a number of ink droplets that pass through the light, and determining the pixel quality in accordance with the number of ink droplets. Determining the number of ink droplets that pass through the emitted light may include measuring a variation in an intensity of light detected by the photodetector.

Optical analyzing may include providing light onto a printed pixel, detecting light transmitted by the printed pixel, and determining the quality of the printed pixel includes in accordance with a transmittance of the printed pixel. The quality of the printed pixel may be determined soon after the pixel is printed. When the inkjet head, a light source for emitting light and a photodetector for detecting light move at a same speed, determining the quality of the printed pixel may occur at a time T after the pixel is printed, where the time T is inversely proportional to the speed.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
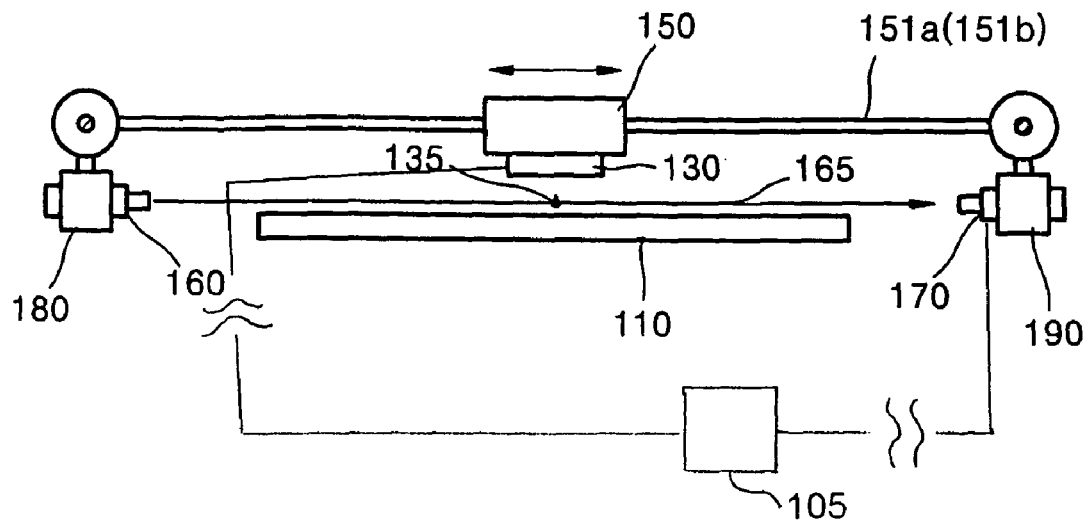
FIG. 1 illustrates a schematic side view of a color filter fabrication apparatus according to a first embodiment of the present invention.

Korean patent application Ser No. 10-2005-0005837, filed on Jan. 21, 2005, in the Korean Intellectual Property Office, and entitled: "Apparatus and Method for Fabricating Color Filter," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

According to the present invention, color filter fabrication may involve a determination as to the quality of a printed pixel, and may involve, e.g., calculating a number of ink droplets ejected from an inkjet head, or measuring a light transmittance of a printed pixel. Further, pixels of an unsatisfactory quality may be repaired through a reprinting and repair process.

Figure 2:
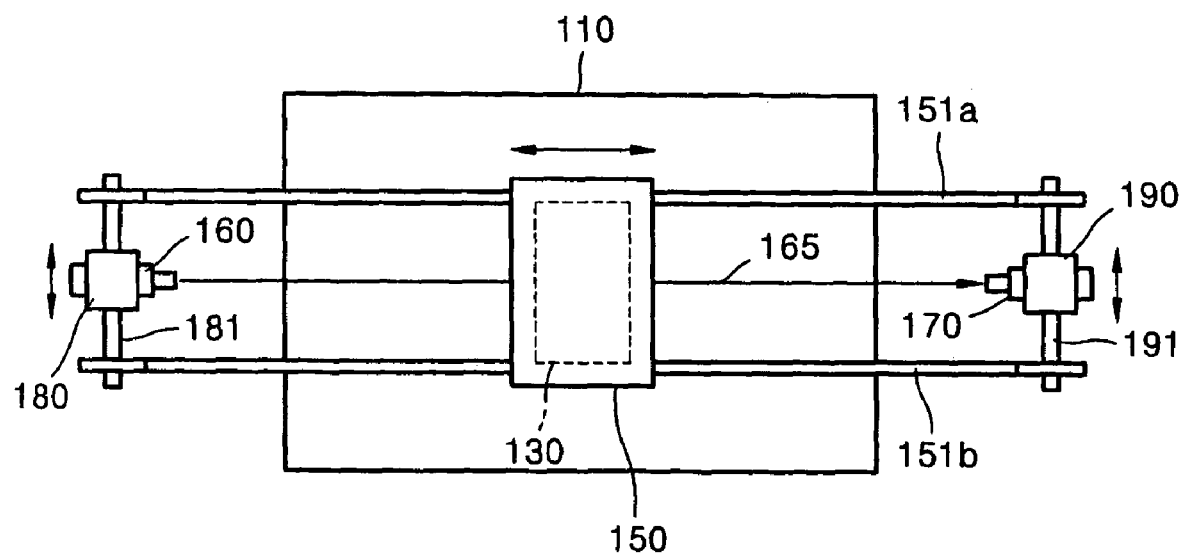
FIG. 2 illustrates a schematic plan view of the color filter fabrication apparatus of FIG. 1.
Figure 3:
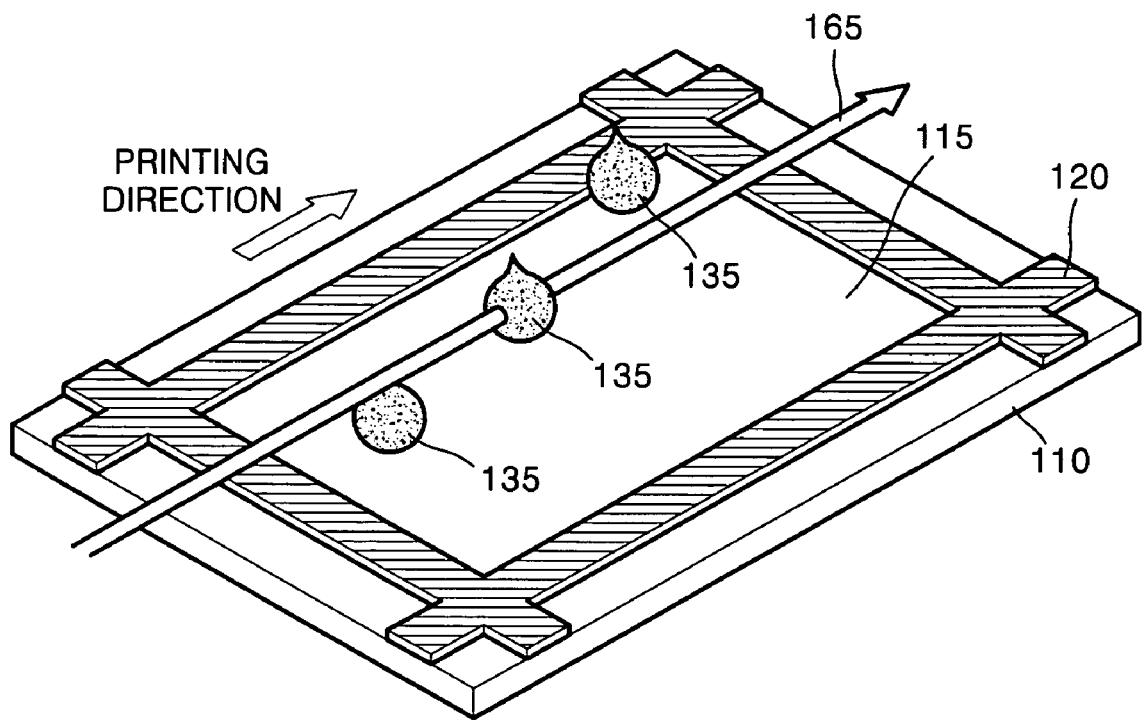
FIG. 3 illustrates a perspective view explaining how ink droplets ejected from an inkjet head pass through light emitted from a light source, according to the first embodiment of the present invention.

FIGS. 1 and 2 illustrate, respectively, schematic side and plan views of a color filter fabrication apparatus according to a first embodiment of the present invention, and FIG. 3 illustrates a perspective view explaining how ink droplets ejected from an inkjet head pass through a light beam emitted from a light source, according to the first embodiment of the present invention. Referring to FIGS. 1-3, the color filter fabrication apparatus according to the present invention may include an inkjet head 130 for ejecting and printing ink droplets 135 of a given color onto each pixel on a substrate 110. The apparatus may further include a light source 160 disposed at one side of the inkjet head 130 and a photodetector 170 disposed at an opposite side of the inkjet head 130, such that the inkjet head 130 is between the light source 160 and the photodetector 170.

The substrate 110 used for the color filter may be, e.g., a transparent substrate such as a glass or plastic substrate. Referring to FIG. 3, a black matrix 120 having a predetermined pattern may be formed on the substrate 110. Each of regions partitioned by the black matrix 120 may constitute one pixel 115.

The inkjet head 130 may be disposed at a predetermined height from the substrate 110 and may eject ink droplets 135 of a given color (e.g., R, G or B color) onto each pixel 115 on the substrate 110. The inkjet head 130 may be, e.g., a piezoelectric inkjet head or a thermal inkjet head. Generally, a piezoelectric inkjet head discharges ink droplets through its nozzles using pressure that applied to the ink by deformation of a piezoelectric element, and a thermal inkjet head discharges ink droplets through its nozzles using the expansive force of ink bubbles formed and expanded by a heat source.

The inkjet head 130 may be mounted on a first carriage 150 that is able to reciprocate in a first direction, for example, the lateral direction, i.e., left-right, in FIGS. 1 and 2, and the printing direction in FIG. 3. The first carriage 150 may reciprocate along a first pair of guides 151a and 151b. The first pair of guides may be, e.g., guide shafts. The inkjet head 130 may eject the ink droplets 135 onto the pixel 115 onto the substrate 110 while reciprocating in the first direction above and along the upper surface of the substrate 110.

The light source 160 may be disposed to one side of the inkjet head 130, e.g., to the left and below, as illustrated in FIGS. 1-2. The light source 160 may emit a light beam 165 and may be oriented such that the ink droplets 135 ejected from the inkjet head 130 pass through the light beam 165. The light source 160 may be, e.g., a point light source configured to emit a line beam, such as the highly collimated beam characteristic of a laser. The light source may be, e.g., a laser diode.

The light source 160 may be mounted on a second carriage 180 that is able to reciprocate in a second direction. The second direction may be, e.g., substantially perpendicular to the first direction, e.g., in the up-down direction illustrated in FIG. 2. The second carriage 180 may reciprocate along a second guide 181. The second guide 181 may be, e.g., a guide shaft. The light source 160 may emit the light beam 165 while moving in the second direction. Referring to FIG. 3, the positions of the ink droplets 135 may also change along the second direction as they are ejected from nozzles in the inkjet head 130 (not shown in FIG. 3).

The photodetector 170 may be disposed opposite the light source 160, e.g., to the side and below the inkjet head 130, to detect the light beam 165 emitted by the light source 160. Thus, the photodetector 170 may detect light, emitted from the light source 160, that has been interrupted or modulated by the ink droplets 135. The photodetector 170 may be, e.g., a photodiode.

The photodetector 170 may be mounted on a third carriage 190 that is able to reciprocate in the second direction. The third carriage 190 may reciprocate along a third guide 191 that may be, e.g., a guide shaft. The third carriage 190 and the second carriage 180 may move in the same direction, such that the photodetector 170 and the light source 160 move parallel to each other. The photodetector 170 and the light source 160 may move in concert so as to maintain alignment therebetween. Thus, the photodetector 170 may detect the light beam 165 emitted from the light source 160 while moving in the second direction in correspondence with the movement of the light source 160.

The photodetector 170 may be coupled to an analyzer 105 for determining the quality of the printed pixel. The analyzer may be coupled via any suitable link including, e.g., wired, optical, radio frequency, etc. The analyzer may be configured to determine the quality of the printed pixel based on the light detected by the photodetector 170. The analyzer may calculate a number of ink droplets 135 interrupting the light beam 165, and may determine the quality of the printed pixel based on a comparison of the number with a reference value, range of values, cut-off limit, etc. The analyzer may be any type of suitable for performing the quality determination, such as a general purpose computer, industrial controller, ASIC, analog electronics, etc. The analyzer may control the inkjet head 150 in accordance with the quality determination, i.e., may control the inkjet head 150 to perform further printing to repair an unsatisfactory pixel, may adjust operational parameters of the inkjet head 150 to correct the unsatisfactory pixels and/or may adjust operational parameters of the inkjet head 150 to avoid or reduce further unsatisfactory pixels, as discussed below.

The color filter fabrication apparatus described above may be used to determine whether the quality of a printed pixel is satisfactory according to methods that will be described herein. Further, a poor or unsatisfactory pixel may be re-printed using the apparatus of the present invention.

In detail, a light beam 165 may be emitted from the light source 160 and oriented to illuminate the photodetector 170. Ink droplets 135 of a given color may be ejected from the inkjet head 130 onto each pixel 115 on the substrate 110. The ejected ink droplets 135 may pass through the light beam 165. The light beam 165 may be detected by the photodetector 170. Accordingly a variation in the intensity of the light beam may be detected by the photodetector 170 and processed by the analyzer 105 as e.g., an ink droplet count, and thus the detected variation may be used to determine the number of the ink droplets 135 ejected onto a printed pixel 115. This number may be used to determine whether the quality of the printed pixel is satisfactory. The quality may be determined by comparing the number of ink droplets ejected onto the printed pixel 115 to, e.g., a predetermined number, a range of numbers, a threshold limit, etc. Note that, although FIG. 3 illustrates an example wherein the inkjet head 130 ejects three ink droplets 135 onto one pixel 115, the number of the ejected ink droplets 135 is not limited to three and, further, may be varied according to the desired printing conditions.

As described, the quality determination, i.e., whether the printed pixel 115 is poor or not, may involve comparing the counted number of the ink droplets 135 with the predetermined value or range there for. When the printed pixel 115 is determined to be of poor quality, the size and/or number of ink droplets to be ejected during a reprinting task may be adjusted, and the reprinting task may be performed on the poor pixel until a pixel of a desired quality, e.g., a desired color, is obtained.

As illustrated, the color filter fabrication apparatus includes one inkjet head 130, one light source 160, and one photodetector 170. However, the present invention is not limited to the illustrated examples and may include a plurality of inkjet heads 130, a plurality of light sources 160, and/or a plurality of photodetectors 170.

Figure 4:
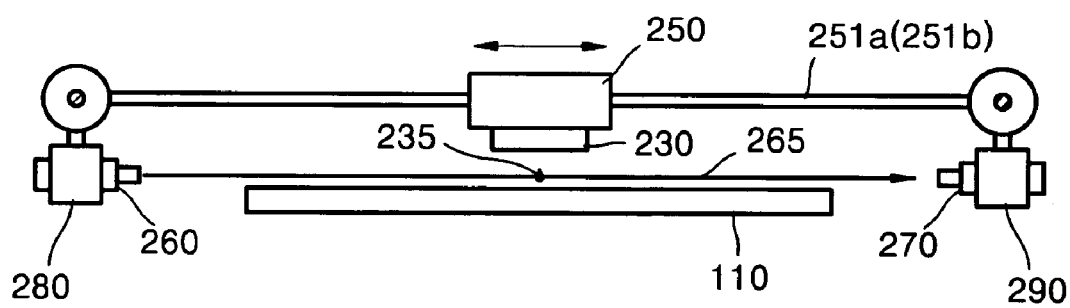
FIG. 4 illustrates a schematic side view of a color filter fabrication apparatus according to a second embodiment of the present invention.
Figure 5:
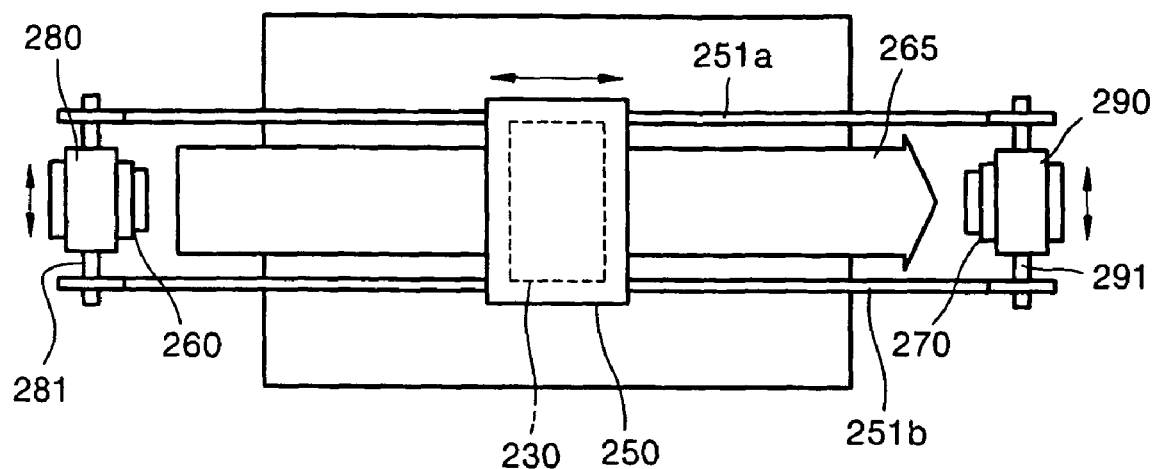
FIG. 5 is a schematic plan view of the color filter fabrication apparatus of FIG. 4.

FIGS. 4 and 5 are, respectively, schematic side and plan views of a color filter fabrication apparatus according to a second embodiment of the present invention. Some features of the color filter fabrication apparatus illustrated in FIGS. 4 and 5 may be substantially similar to those described above with respect to FIGS. 1-3. Therefore, in order to avoid repetition, a detailed explanation of the similar features will be omitted from the following detailed description of second embodiment.

Referring to FIGS. 4 and 5, the color filter fabrication apparatus may include an inkjet head 230 for ejecting and printing ink droplets 235 onto each pixel of a substrate 110. The color filter fabrication apparatus may also include a light source 260 disposed to one side of the inkjet head 230, and a photodetector 270 disposed at the other side of the inkjet head 230, such that the inkjet head 230 is disposed between the light source 260 and the photodetector 270.

The inkjet head 230 may be disposed at a predetermined height from the substrate 110 to eject ink droplets 235 of a given color onto each pixel on the substrate 110. The inkjet head 230 may be, e.g., a piezoelectric inkjet head or a thermal inkjet head. The inkjet head 230 may be mounted on a first carriage 250 that is able to reciprocate in a first direction. The first direction may be, e.g., a lateral direction in FIGS. 4 and 5, i.e., left-right. The first carriage 250 may reciprocate along a pair of first guides 251a and 251b, e.g., guide shafts.

The light source 260 may be disposed to the side and below the inkjet head 230 and may emit a light beam 265 through which the ink droplets 235 ejected from the inkjet head 230 may pass. Referring to FIG. 5, the light source 260 may be a line light source emitting a sheet beam, i.e., a beam of light that has a planar aspect, as indicated by the broad arrow in FIG. 5. The light source 260 may be, e.g., a laser diode.

The light source 260 may be mounted on a second carriage 280 that is able to reciprocate in a second direction, e.g., an up-down direction in FIG. 5. The second direction may be substantially perpendicular to the first direction. The second carriage 280 may reciprocate along a second guide 281, such as a guide shaft. Thus, the light source 260 may emit a sheet of light 265 while moving in the second direction. The width of the sheet of light 265 may be determined to suit the particular needs of the application.

The photodetector 270 may be disposed opposite the light source 260, below and to the other side of the inkjet head 230, to detect the light beam 265 that has passed through the ink droplets 235 after being emitted from the light source 260. The photodetector 270 may be, e.g., a photodiode.

The photodetector 270 may be mounted on a third carriage 290 that is able to reciprocate in the second direction, i.e., in the same direction as the second carriage 280. The third carriage 290 may reciprocate along a third shaft 191, which may be, e.g., a guide shaft. Thus, the photodetector 270 may detect the light beam 265, emitted from the light source 260. The photodetector 270 may move in the second direction in correspondence with the movement of the light source 260.

In the color filter fabrication apparatus described above, the inkjet head 230 may simultaneously eject a plurality of ink droplets 235, which may be directed at a plurality of pixels. Referring to FIG. 5, the plurality of pixels may be a row of pixels, i.e., pixels adjacent to each other in the up-down direction in FIG. 5. The sheet light beam 265 may pass through the simultaneously-ejected ink droplets 235, and may be detected by the photodetector 270. The color filter fabrication apparatus may include a plurality of photodetectors 270, which may be disposed adjacent to each other in the direction of the row of the plurality of pixels, i.e., in the up-down direction in FIG. 5. That is, although the color filter fabrication apparatus illustrated in FIG. 5 includes one inkjet head 230, one light source 260, and one photodetector 270, the present invention is not limited to the illustrated examples, and may include a plurality of inkjet heads 230, a plurality of light sources 260, and/or a plurality of photodetectors 270. For example, multiple inkjet heads 230, light sources 260, and/or photodetectors 270 may be arranged side-by-side on the respective carriages. Thus, the color filter fabrication apparatus according to the present invention may be employed to, e.g., simultaneously determine the quality of a plurality of printed pixels.

Figure 6:
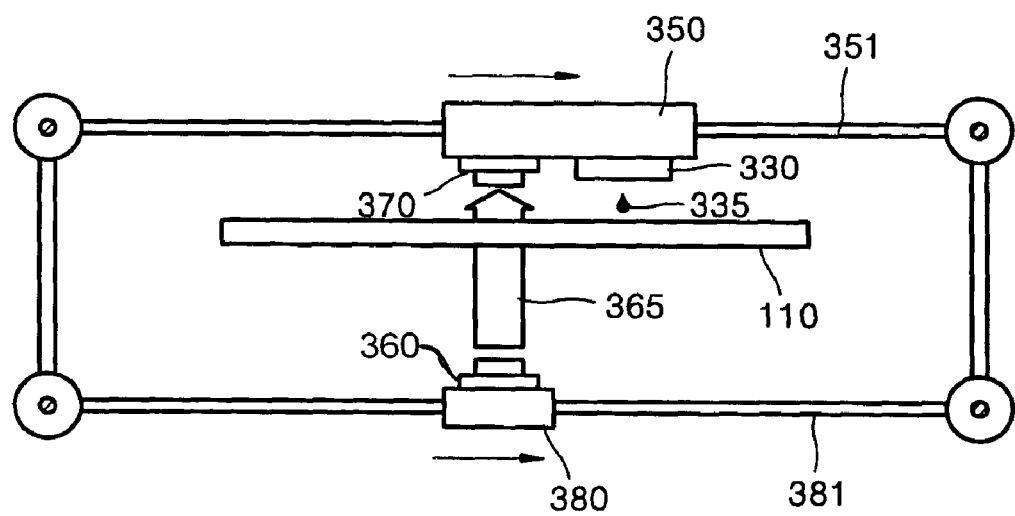
FIG. 6 illustrates a schematic side view of a color filter fabrication apparatus according to a third embodiment of the present invention.

FIG. 6 illustrates a schematic side view of a color filter fabrication apparatus according to a third embodiment of the present invention. Referring to FIG. 6, the color filter fabrication apparatus may include an inkjet head 330 for ejecting and printing ink droplets 335 of a given color onto each pixel on a substrate 110, a light source 360 emitting a light beam onto a printed pixel, and a photodetector 370 detecting a light beam penetrating the printed pixel, such that the light beam is affected by the transmittance of the printed pixel.

The inkjet head 330 may be disposed at a predetermined height from the substrate 110 to eject ink droplets 335 of a given color (e.g., R, G or B color) onto each pixel on the substrate 110. The inkjet head 330 may be, e.g., a piezoelectric inkjet head or a thermal inkjet head.

The inkjet head 330 may be mounted on a first carriage 350 that is able to reciprocate in a first direction, e.g., the lateral or left-right direction in FIG. 6. The inkjet head 330 may eject ink droplets while moving in the first direction, as indicated by the right-facing arrow in the upper portion of FIG. 6. The inkjet head may be arranged to traverse the substrate 110, e.g., above and along the upper surface of the substrate 110. The first carriage 350 may reciprocate along a first guide 351, which may be, e.g., a guide shaft.

The light source 360 may be disposed on an opposite side of the substrate 110 from the inkjet head 330, such that the substrate 110 is interposed between the light source 360 and the inkjet head 330. For example, referring to the example illustrated in FIG. 6, the inkjet head 330 may be disposed above the substrate 110 and the light source 360 may be disposed below the substrate 110. Of course, it will be understood that relative terms such as "above" and "below" are used merely for explanatory purposes, and the present invention is not limited to the orientations described and illustrated herein.

The light source 360 may be oriented under the inkjet head 330 to emit a light beam 365 toward a pixel printed by the inkjet head 330. The color filter fabrication apparatus may be constructed such that the light source 360 is disposed in a substantially perpendicular direction with respect to the printed pixel or the substrate 110. That is, light emitted by the light source 360 may traverse the substrate 110 in a direction that is substantially perpendicular there to.

The light source 360 may be mounted on a second carriage 380 that is able to reciprocate in the first direction, i.e., in the same direction as the first carriage 350. The second carriage 380 may reciprocate along a second guide 381, which may be, e.g., a guide shaft. The light source 360 may be, e.g., a laser diode.

The photodetector 370 may be disposed opposite to the light source 360 with the substrate 110 interposed therebetween, and may detect light 365 that is emitted from the light source 360 and penetrates the printed pixel. Thus, the photodetector 370 may detect variations in the transmittance of the printed pixels. The photodetector 370 may be, e.g., a photodiode.

The photodetector 370 may be mounted on the first carriage 350, such that both the inkjet head 330 and the photodetector 370 are mounted on the same carriage 350. Thus, the photodetector 370 may detect light, emitted by the light source 360 and traversing a printed pixel, while moving together with the inkjet head 330. In other implementations, the photodetector 370 may be mounted on a separate carriage. Further, although, in the example illustrated in FIG. 6, the light source 360 is disposed below the substrate 110 and the photodetector 370 is disposed adjacent to the inkjet head 330 and above the substrate 110, the present invention is not limited to this arrangement, and the light source 360 may be disposed, e.g., above the substrate 110 and adjacent to the inkjet head 330 while the photodetector 370 is disposed below the substrate 110.

The light source 360 and photodetector 370 may be disposed relative to the inkjet head 330 so as to illuminate and detect the quality of a pixel that has been recently printed by the inkjet head 330. For example, as illustrated in FIG. 6, the light source 360 may emit the light beam 365 onto a recently printed pixel while moving in correspondence with the movement of the inkjet head 330, e.g., to the right in FIG. 6. The inkjet head 330, the light source 360 and the photodetector 370 may move at a same speed, such that determining the quality of the printed pixel may occur at a time T after the pixel is printed, where the time T is inversely proportional to the speed at which the three components traverse the substrate 110. Thus, the quality of the printed pixel may be determined soon after the pixel is printed, with the elapsed time corresponding to the speed at which the inkjet head 330, the light source 360 and the photodetector 370 traverse the substrate 110. As will be apparent to those of skill in the art, the elapsed time may also correspond to the relative spacings of the inkjet head 330 and photodetector 370 on the carriage 350, or the relative spacings of the inkjet head 330 and the photodetector 370 on separate carriages, etc.

Further, although FIG. 6 illustrates an example wherein the color filter fabrication apparatus includes one inkjet head 330, one light source 360, and one photodetector 370, the present invention is not so limited, and may include a plurality of inkjet heads 330, a plurality of light sources 360, and/or a plurality of photodetectors 370.

A quality of a printed pixel, i.e., a poorly printed pixel, may be determined according to the following method, which may be performed using the color filter fabrication apparatus according to the third embodiment of the present invention. A pixel may be printed by ejecting ink droplets 335 from the inkjet head 330 onto a given pixel on the substrate 110, and the inkjet head 330 may be translated across the substrate 110, repeating this process. The inkjet head may move, e.g., to the right as illustrated in FIG. 6, as indicated by the right-facing arrow in the upper portion of FIG. 6. After the pixel is printed, a light beam 365 may be emitted from the light source 360 onto a lower surface of the printed pixel. This may occur when the pixel is recently printed. The light beam 365, having passed through the printed pixel, may be detected by the photodetector 370 and processed by an analyzer (not shown). The analyzer may be any suitable device and may be the same as described above with reference to FIG. 1. The detected light may be used to determine the quality of the printed pixel, i.e., whether the printed pixel is satisfactory or poor, by measuring the transmittance of the printed pixel. That is, the light beam may be detected by the photodetector 370 and a signal output from the photodetector 370 may be evaluated and compared with a reference value, such that the measured transmittance of the printed pixel is compared with a reference. The reference may be, e.g., a known transmittance, threshold value, acceptable range of values, etc.

If the quality of the printed pixel is determined to be poor, the size and/or number of ink droplets 335 may be adjusted and a reprinting task may performed on the poor pixel until a pixel of a desired quality, e.g., having a desired color, is obtained. Additionally or alternatively, the parameters of the inkjet head operation may be adjusted to avoid future unsatisfactory pixels.

Figure 7:
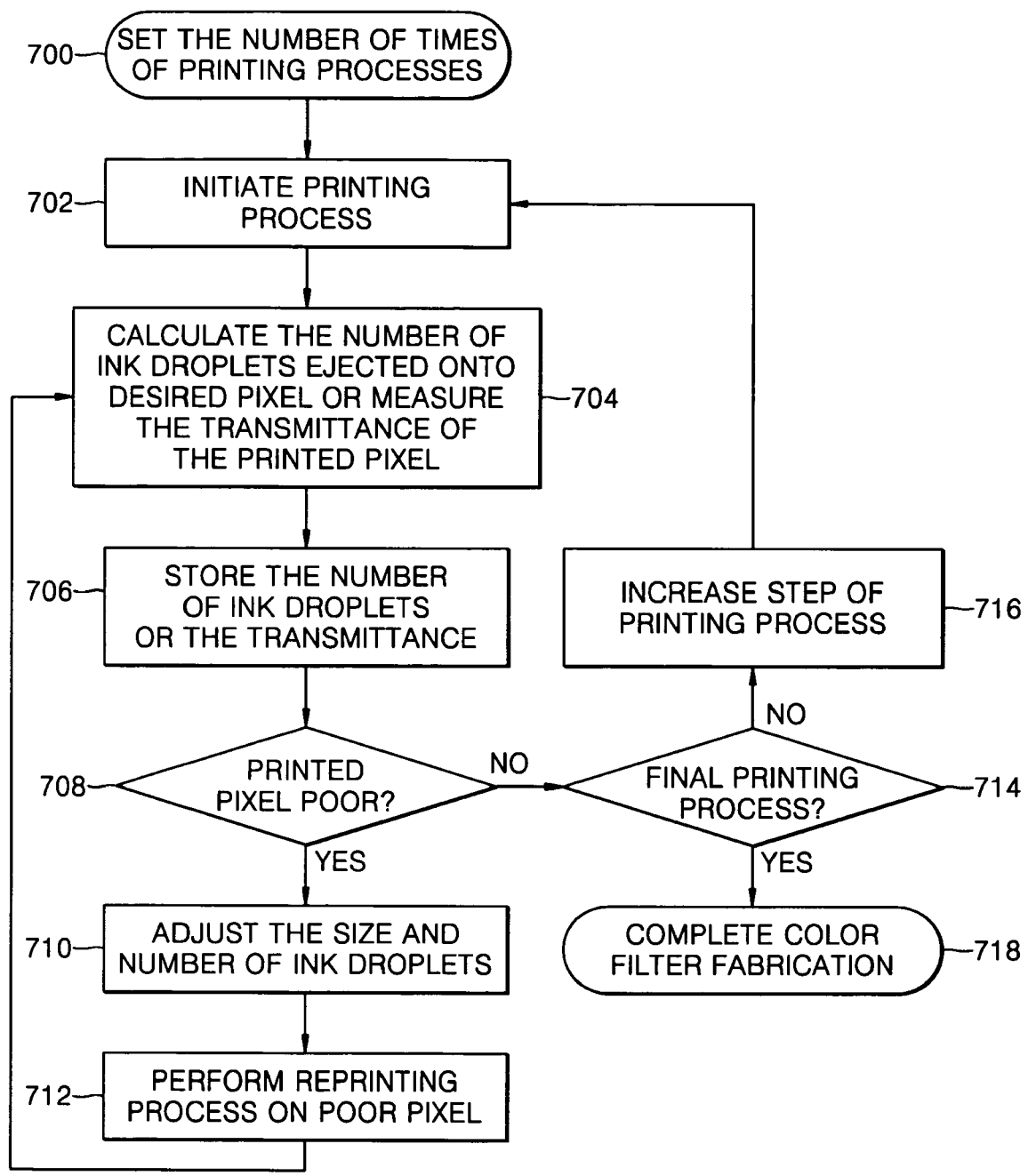
FIG. 7 illustrates a flowchart of a color filter fabricating method according to an embodiment of the present invention.

FIG. 7 illustrates a flowchart of a color filter fabricating method according to an embodiment of the present invention, in which exemplary additional details are described. It will be appreciated, however, that the method of the present invention may be implemented in a variety of ways, including additional, omitted or combined operations, operations performed in different sequences, etc., and, thus, is not limited to the example illustrated in FIG. 7.

Referring to FIG. 7, a printing process of ejecting ink droplets of a given color from an inkjet head onto each pixel of a substrate may be performed to fabricate a color filter. Multiple cycles of the printing process operations may be performed, with the number of cycles that is anticipated to be necessary for fabricating the color filter set in a first operation 700. At this stage, the number and/or size of ink droplets for each printing cycle may also be set.

In operation 702, each printing process cycle may be initiated according to predetermined printing conditions. After termination of each printing process cycle, a determination may be made as to whether a printed pixel is poor or not. Thus, in operation 704, data indicative of the quality of the printed pixel may be captured, e.g., a number of ink droplets ejected onto the printed pixel a transmittance of the printed pixel, etc.

In operation 706, a calculated number or measured transmittance of a printed pixel may be stored, and in operation 708 the quality of the printed pixel may be determined based on whether the stored number or transmittance satisfies a desired value or range. Note that, in order to avoid repetition, further details of the quality determination methods will be omitted, as they have been described above in detail.

If the quality of a printed pixel is determined to be poor, a repairing process may be performed on the poor pixel. For example, a size and/or number of ink droplets to be ejected from the inkjet head during a repair process may be adjusted in operation 710, and a reprinting process may be performed to repair the poor pixel in operation 712. The reprinting process may be repeatedly performed until the printed pixel satisfies the quality requirements, e.g., it has a desired color.

If the quality of the printed pixel is not poor, a determination may be made as to whether the just-completed printing process cycle is the final one (operation 714). If, in operation 714, it is determined that the overall printing process has not been completed, one or more additional cycles of the printing process may be performed (operation 716) or, if, in operation 714, it is determined that the overall printing process is done, the color filter fabrication method may be completed in operation 718.

As illustrated in FIG. 7, the repairing process may be performed for each printing process cycle. However, the present invention is not limited to the illustrated example, and the repairing process may be performed after the end of the printing process. The operational parameters of the inkjet head may be adjusted in accordance with the quality determination to prevent or reduce future unsatisfactory pixels, or the operational parameters may only be altered when a pixel is to be repaired.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for fabricating a color filter, comprising:
an inkjet head disposed to print a pixel on a substrate;
an optical system disposed relative to the inkjet head and the substrate, the optical system including a light source for emitting light and a photodetector for detecting the light, the photodetector generating data indicative of a pixel quality of the pixel;
an analyzer receiving the data, determining the pixel quality based on the data and controlling the inkjet head in accordance with the pixel quality,
a first carriage reciprocating in a first direction and having the inkjet head mounted thereto;
a second carriage reciprocating in a second direction and having the light source mounted thereto; and
a third carriage reciprocating in the second direction and having the photodetector mounted thereto,
wherein the inkjet head is disposed between the light source and the photodetector such that ink droplets ejected from the inkjet head pass through light emitted by the light source.

2. The apparatus as claimed in claim 1, wherein the optical the light source is a point light source emitting a line beam.

3. The apparatus as claimed in claim 1, wherein the light source is a line light source emitting a sheet beam.

4. The apparatus as claimed in claim 1, wherein the light source is a laser diode.

5. The apparatus as claimed in claim 1, wherein the photodetector is a photodiode.

6. The apparatus as claimed in claim 1, wherein the inkjet head is a thermal inkjet head or a piezoelectric inkjet head.

7. The apparatus as claimed in claim 1, further comprising one or more additional inkjet heads, light sources, photodetectors, or combinations thereof.

8. The apparatus as claimed in claim 1, wherein
the analyzer determines the quality of the printed pixel based on a number of ink droplets that pass through the emitted light.

9. The apparatus as claimed in claim 1, wherein the second direction is substantially perpendicular to the first direction.

10. The apparatus as claimed in claim 1, wherein the second and third carriages move corresponding to each other.

11. The apparatus as claimed in claim 1, wherein the light source is disposed to emit light at the printed pixel,
   the photodetector is disposed to detect light transmitted by the printed pixel, and
   the analyzer determines the quality of the printed pixel based on a transmittance of the printed pixel.

12. The apparatus as claimed in claim 11, wherein the light source and the photodetector are arranged relative to the inkjet head such that that light emitted by the light source and detected by the photodetector passes through a recently printed pixel.

13. The apparatus as claimed in claim 11, wherein the light source and the photodetector are disposed such that light emitted by the light source and detected by the photodetector passes through the printed pixel in a direction that is substantially perpendicular to the printed pixel.

14. The apparatus as claimed in claim 13, wherein the photodetector is disposed adjacent to the inkjet head, and
   the light source is disposed opposite to the photodetector such that a substrate being printed is interposed between the photodetector and the light source.

15. The apparatus as claimed in claim 14, further comprising:
   a first carriage reciprocating in a first direction and having the inkjet head and the photodetector mounted thereto; and
   a second carriage reciprocating in the first direction and having the light source mounted thereto.

16. The apparatus as claimed in claim 15, wherein the first and second carriages move corresponding to each other.

17. The apparatus as claimed in claim 13, wherein the light source is disposed adjacent to the inkjet head, and
   the photodetector is disposed opposite to the light source such that a substrate being printed is interposed between the photodetector and the light source.

18. The apparatus as claimed in claim 17, further comprising:
   a first carriage reciprocating in a first direction and having the inkjet head and the light source mounted thereto; and
   a second carriage reciprocating in the first direction and having the photodetector mounted thereto.

19. The apparatus as claimed in claim 18, wherein the first and second carriages move corresponding to each other.

* * * * *